United States Patent
Jung et al.

(10) Patent No.: US 10,877,698 B2
(45) Date of Patent: Dec. 29, 2020

(54) SEMICONDUCTOR DEVICE FOR MANAGING COLD ADDRESSES OF NONVOLATILE MEMORY DEVICE

(71) Applicants: SK hynix Inc., Icheon (KR); Seoul National University R&DB Foundation, Seoul (KR)

(72) Inventors: Hyunmin Jung, Hwaseong (KR); Sunwoong Kim, Changwon (KR); Hyokeun Lee, Seoul (KR); Woojae Shin, Seoul (KR); Hyuk-Jae Lee, Seongnam (KR)

(73) Assignees: SK hynix Inc., Icheon (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 16/434,001

(22) Filed: Jun. 6, 2019

(65) Prior Publication Data
US 2020/0012454 A1   Jan. 9, 2020

(30) Foreign Application Priority Data
Jul. 5, 2018 (KR) .......................... 10-2018-0078411

(51) Int. Cl.
  *G06F 3/06*  (2006.01)
(52) U.S. Cl.
  CPC .......... *G06F 3/0659* (2013.01); *G06F 3/0604* (2013.01); *G06F 3/0653* (2013.01); *G06F 3/0679* (2013.01)

(58) Field of Classification Search
  CPC .... G06F 12/0246; G06F 3/0679; G06F 3/064; G06F 3/0644
  See application file for complete search history.

(56) References Cited

U.S. PATENT DOCUMENTS

| | | | |
|---|---|---|---|
| 8,788,778 B1 * | 7/2014 | Boyle ................. | G06F 12/0253 711/155 |
| 2014/0143474 A1 * | 5/2014 | Damle ............... | G06F 12/0246 711/103 |
| 2015/0019794 A1 * | 1/2015 | Byun .................. | G06F 12/0246 711/103 |
| 2015/0347296 A1 * | 12/2015 | Kotte .................... | G06F 3/0679 711/103 |

(Continued)

FOREIGN PATENT DOCUMENTS

| | | |
|---|---|---|
| KR | 20170075835 | 7/2017 |
| KR | 20170078310 | 7/2017 |

*Primary Examiner* — Charles Rones
*Assistant Examiner* — Hewy H Li

(57) ABSTRACT

A semiconductor device may include a media controller configured to output a write requested address when a write request to a nonvolatile memory device is provided from a host; and a cold address manager. The cold address manager may include a stack storing meta data for the write requested address, region information storage configured to manage addresses of the nonvolatile memory device with regions such that length of a region of the regions may vary after a predetermined period, a cold address detector configured to update the stack and the region information storage after the predetermined period and to detect whether an address of the nonvolatile memory device is a cold address, the cold address having write requests performed at less than a predetermined level.

18 Claims, 16 Drawing Sheets

(56) References Cited

U.S. PATENT DOCUMENTS

| | | | |
|---|---|---|---|
| 2016/0098215 A1* | 4/2016 | Song | G06F 3/0619 |
| | | | 711/103 |
| 2016/0179386 A1* | 6/2016 | Zhang | G06F 3/0688 |
| | | | 711/103 |
| 2016/0253238 A1* | 9/2016 | Strauss | G06F 11/1048 |
| | | | 714/721 |
| 2017/0024326 A1 | 1/2017 | Luo et al. | |

* cited by examiner

SEMICONDUCTOR DEVICE FOR MANAGING COLD ADDRESSES OF NONVOLATILE MEMORY DEVICE

CROSS-REFERENCE TO RELATED APPLICATIONS

The present application claims priority under 35 U.S.C. § 119(a) to a Korean Patent Application No. 10-2018-0078411, filed on Jul. 5, 2018, which are incorporated herein by reference in its entirety.

BACKGROUND

1. Technical Field

Various embodiments may generally relate to a semiconductor device that manages addresses of a nonvolatile memory device where write requests are relatively less concentrated.

2. Related Art

Nonvolatile memory devices are generally limited in the number of writes that may be performed due to the physical and chemical properties of the devices.

For example, a cell in a phase change memory may have a lifetime corresponding to about ten million write operations.

If write operations are concentrated on a specific cell of the memory device, the lifetime of the entire memory device may be reduced due to the shortening of the lifetime of the specific cell.

Accordingly, wear leveling operations are performed to uniformly distribute write operations across all cells of the memory device.

Conventionally, in order to perform a wear leveling operation, a mapping relationship between a logical address and a physical address is changed at regular intervals.

In particular, a hot address (that is, a physical address where write requests are concentrated) is detected and a wear leveling operation is performed on the hot address.

When performing a wear leveling operation, a logical address mapped to the hot address is typically remapped to a cold address (that is, a physical address where write requests have been performed less frequently than other physical addresses.)

However, if a selected cold address has a warm property where write operations are performed to a certain extent, wear leveling operations may be performed frequently.

Therefore, it is preferable to appropriately select a cold address when performing a wear leveling operation.

Conventionally, there is no special management for cold addresses apart from managing hot addresses.

Accordingly, in addition to managing hot addresses, there is a need for a technique for efficiently managing cold addresses to improve efficiency of a wear leveling operation.

SUMMARY

In accordance with the present teachings, a semiconductor device may include a media controller configured to output a write requested address when a write request to a nonvolatile memory device is provided from a host; and a cold address manager comprises a stack storing meta data for pertaining to requested write addresses, region information storage configured to manage addresses of the nonvolatile memory device with regions such that a length of a region of the regions may vary at times according to a predetermined period, a cold address detector configured to update the stack and the region information storage at the predetermined period and to detect whether an address of the nonvolatile memory device is a cold address where write requests to the address are performed at less than a predetermined level.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed novelty, and explain various principles and advantages of those embodiments.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of the present teachings. The detailed description is not meant to limit this disclosure. Rather, the scope of the present disclosure is defined in accordance with the presented claims and equivalents thereof.

Figure 1:
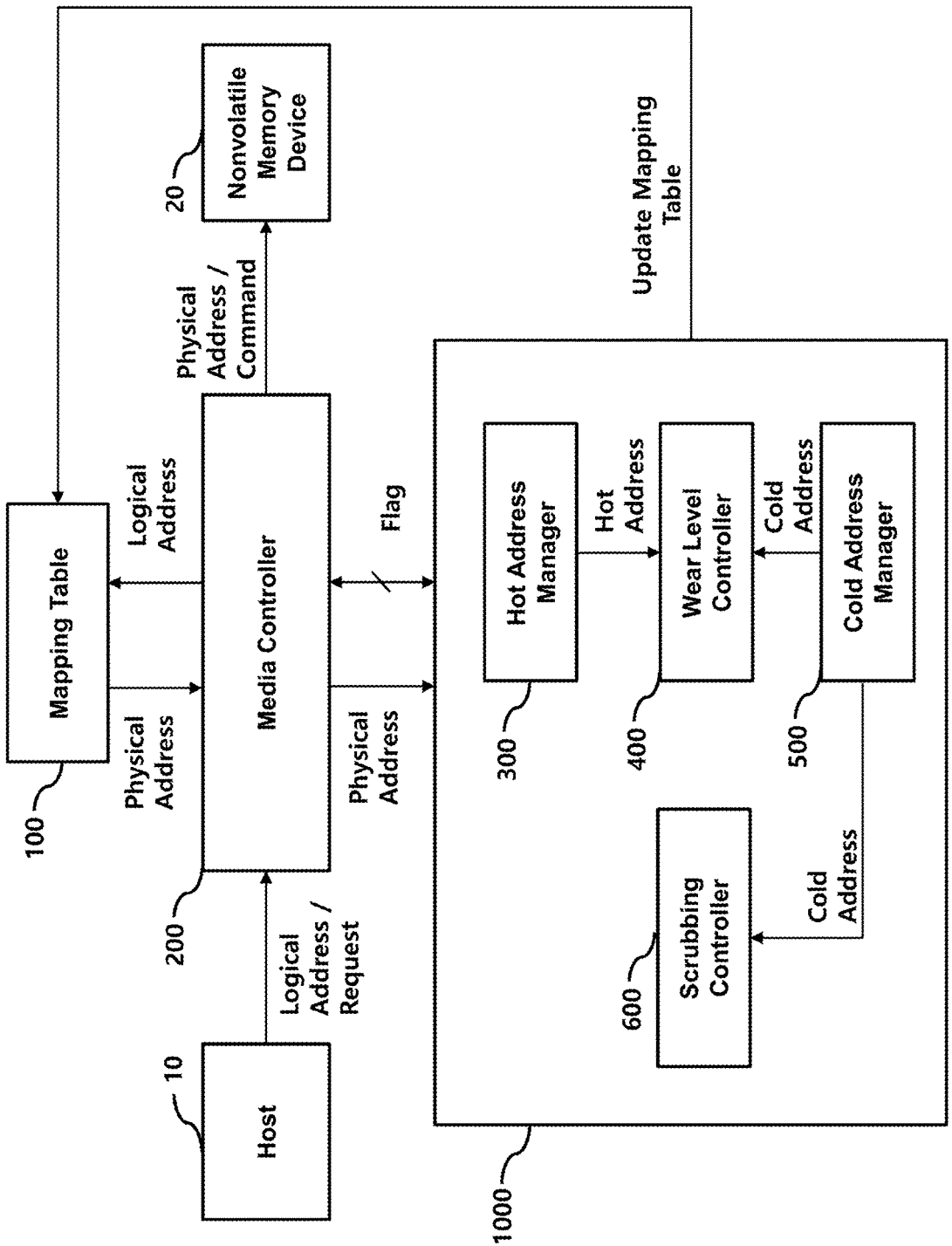
FIG. 1 shows a block diagram illustrating a semiconductor device according to an embodiment of the present disclosure.

FIG. 1 shows a block diagram illustrating a semiconductor device according to an embodiment of the present disclosure.

The semiconductor device according to an embodiment of the present disclosure includes a mapping table 100, a media controller 200, and a cold address manager 500.

The semiconductor device according to an embodiment of the present disclosure may further include a hot address manager 300 and a wear level controller 400.

The semiconductor device according to an embodiment of the present disclosure may further include a scrubbing controller 600.

The hot address manager 300, the wear level controller 400, the cold address manager 500 and the scrubbing controller 600 may be implemented in hardware, software, or a combination thereof to be included in a control module 1000. The control module 1000 may be included in a same module or a chip with the media controller 200.

The media controller 200 outputs a physical address and a command corresponding to a request to the nonvolatile memory device 20 in accordance with a logical address provided with the request from the host 10.

Figure 2:
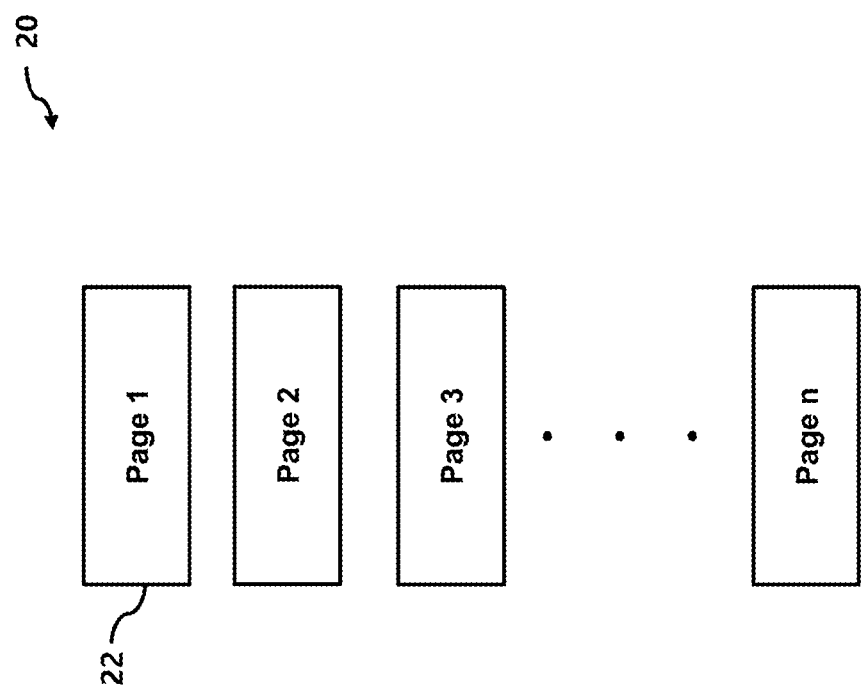
FIG. 2 shows a block diagram illustrating a nonvolatile memory device according to an embodiment of the present disclosure.

In this embodiment, it is assumed that the nonvolatile memory device 20 includes a plurality of pages 22 as shown in FIG. 2 and performs a write operation on a page basis. In particular, the mapping of logical addresses to physical addresses for a write operation may be performed on a page basis, wherein logical pages are mapped to corresponding physical pages.

In the present disclosure, the nonvolatile memory device 20 may be any memory device suitable for performing a wear leveling operation, such as a flash memory device, a phase change memory device, or the like.

The relationship between a logical address used by the host 10 and a corresponding physical address of the nonvolatile memory device 20 is managed by using the mapping table 100.

In this embodiment, the mapping table 100 may be implemented using a volatile memory device such as a dynamic random access memory (DRAM).

Figure 3:
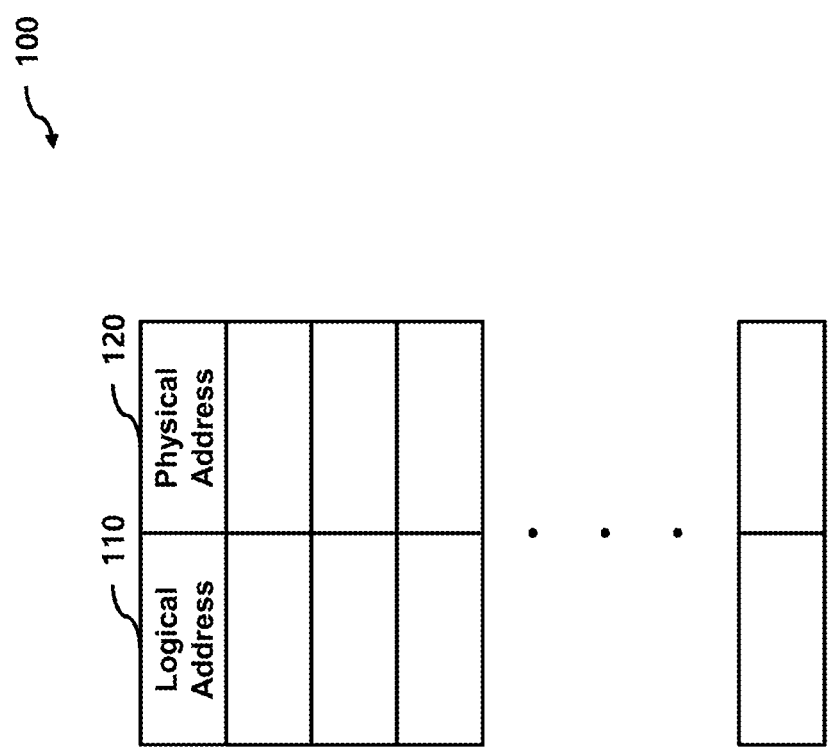
FIG. 3 shows a table illustrating a data structure of a mapping table according to an embodiment of the present disclosure.

FIG. 3 shows a block diagram illustrating a data structure of the mapping table 100.

The mapping table 100 includes a logical address field 110 for storing a logical address and a physical address field 120 for storing a physical address corresponding to a logical address. In an embodiment, the logical address corresponds to a logical page address (that is, an address indicating a first logical address of a logical page), and the physical address corresponds to a physical page address (that is, an address indicating a first physical address of a physical page).

In the wear leveling operation, the wear level controller 400 may control the mapping table 100 to change the mapping relation between a logical address and a physical address.

In this embodiment, the media controller 200 controls the mapping table 100 to determine whether a physical address corresponding to a logical address requested by the host 10 exists in the mapping table 100.

The media controller 200 provides the control module 1000 with a physical address of a write request being performed.

The hot address manager 300 detects a hot address using a physical address provided by the media controller 200 and stores the hot address.

In this embodiment, the hot address manager 300 suffices to detect and store the hot address from the physical addresses where write requests are performed, and implementing the hot address manager 300 is not limited to a specific implementation.

For example, the hot address manager 300 may be implemented by a conventional technology.

The hot address manager 300 may provide the detected hot address to the wear level controller 400 during a wear leveling operation.

Figure 4:
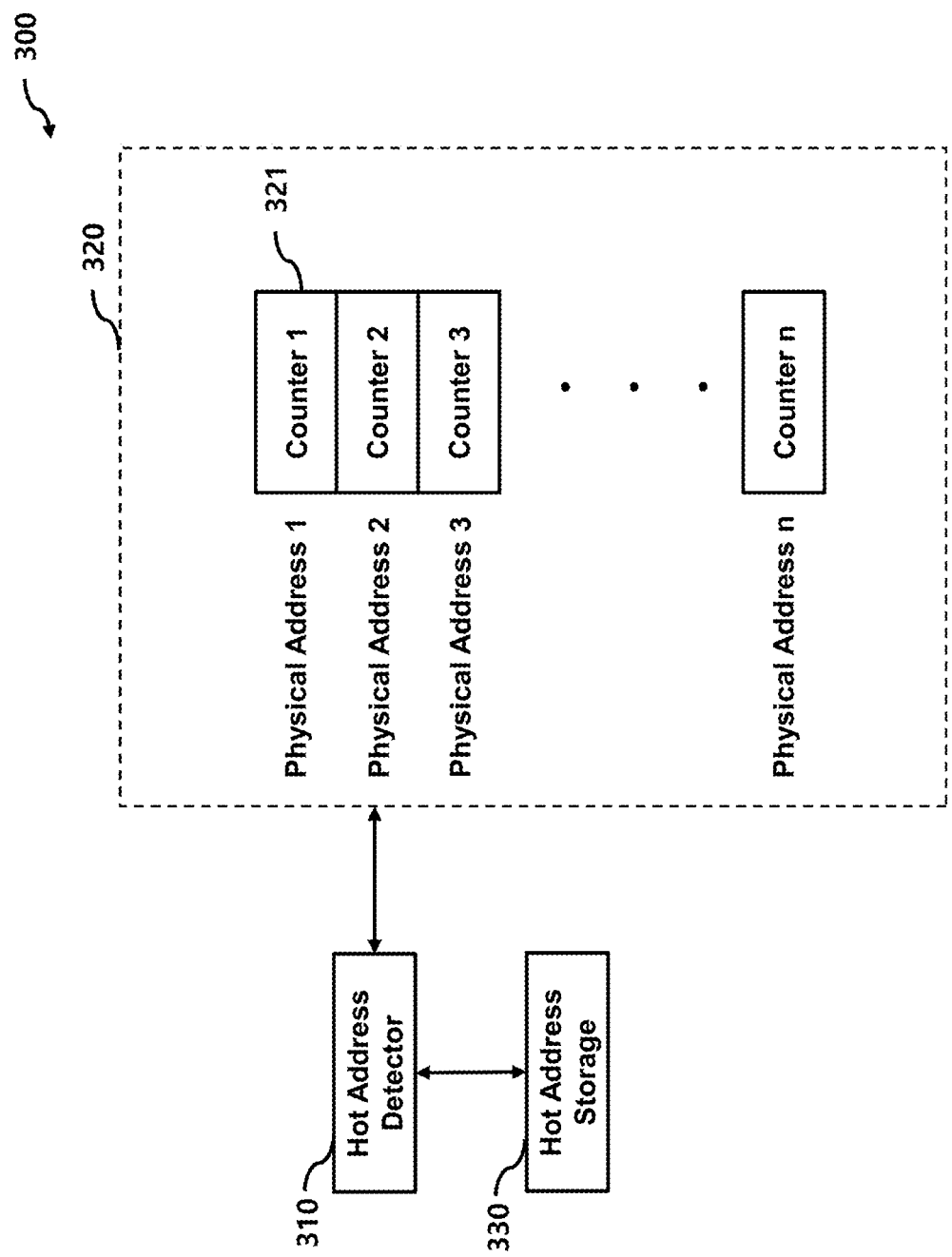
FIG. 4 shows a block diagram illustrating a hot address manager according to an embodiment of the present disclosure.

FIG. 4 shows a block diagram illustrating a hot address manager 300 according to an embodiment of the present disclosure.

The hot address manager 300 includes a hot address detector 310, a counter array 320, and a hot address storage 330.

The counter array 320 includes a plurality of counters 321 each corresponding to a physical address. The physical address may be a physical page address.

The value of the corresponding counter 321 is updated when a write request for a corresponding physical address is provided from the media controller 200. When the counters 321 correspond to respective physical page addresses, a counter 321 is updated when a write request is for a physical address within the physical page having the physical page address corresponding to the counter 321; for example, when a counter 321 corresponds to the physical page address of physical page 1, that counter 321 is updated when a write request is for any physical address within physical page 1.

In the present disclosure, the hot address detector 310 selects a physical address having a counter value equal to or greater than a threshold value as a hot address, and stores the selected physical address in the hot address storage 330.

The method and criteria to select a hot address at the hot address detector 310 can be variously changed according to embodiments.

In addition, various design changes such as configuring the counter array in multiple levels in order to reduce number of counters 321 are also possible.

The cold address manager 500 detects a cold address using the physical address provided by the media controller 200 and stores the cold address.

The cold address manager 500 may provide the detected cold address to the wear level controller 400.

A specific configuration and operation method of the cold address manager 500 will be described in detail below.

The wear level controller 400 controls the wear leveling operation using the hot address and the cold address.

For example, the wear level controller 400 may control the mapping table 100 to change the mapping relation between hot and cold addresses, for example, by remapping a logical address mapped to a hot address to instead be mapped to a cold address.

In this embodiment, the wear level controller 400 suffices to perform the wear leveling operation using the cold address provided by the cold address manager 500, and is not necessarily implemented in a specific manner. Remapping a logical address may include copying data previously stored in a hot address the logical address had been mapped to so that the data is stored at a cold address the logical address is remapped to.

In this embodiment, the wear level controller 400 may activate a flag and provide the flag to the media controller 200 during the wear leveling operation.

The wear leveling operation may be performed in the idle state when a request from the host 10 is not processed. In this case, the media controller 200 may first provide a flag to the wear level controller 400 to inform the idle state.

The wear level controller 400 may provide the media controller 200 with a flag representing whether the wear leveling operation is being performed or not.

The flag may be a multi-bit signal which include a bit indicating the idle state and a bit indicating the wear leveling operation.

The scrubbing controller 600 may perform a scrubbing operation at regular intervals.

For example, if the nonvolatile memory device 20 is a phase change memory device, the data recorded in the cell may be changed by drift phenomenon.

In order to prevent this, the scrubbing controller 600 may perform, at regular intervals, a scrubbing operation in which data is read and written to the nonvolatile memory device 20, similarly to how a refresh operation of a DRAM is performed.

In this case, if there is an error in the data read by the scrubbing operation, the error can be corrected and rewritten.

In this embodiment, the scrubbing controller 600 may perform a scrubbing operation with respect to the address identified by the cold address.

To this end, the cold address manager 500 may provide the detected cold address to the scrubbing controller 600.

The scrubbing controller 600 may provide the media controller 200 with a flag indicating a scrubbing operation and a cold address in order to perform a scrubbing operation.

In response, the media controller 200 may perform, using the cold address supplied by the scrubbing controller 600, a read operation followed by a write operation to the nonvolatile memory device 20.

Figure 5:
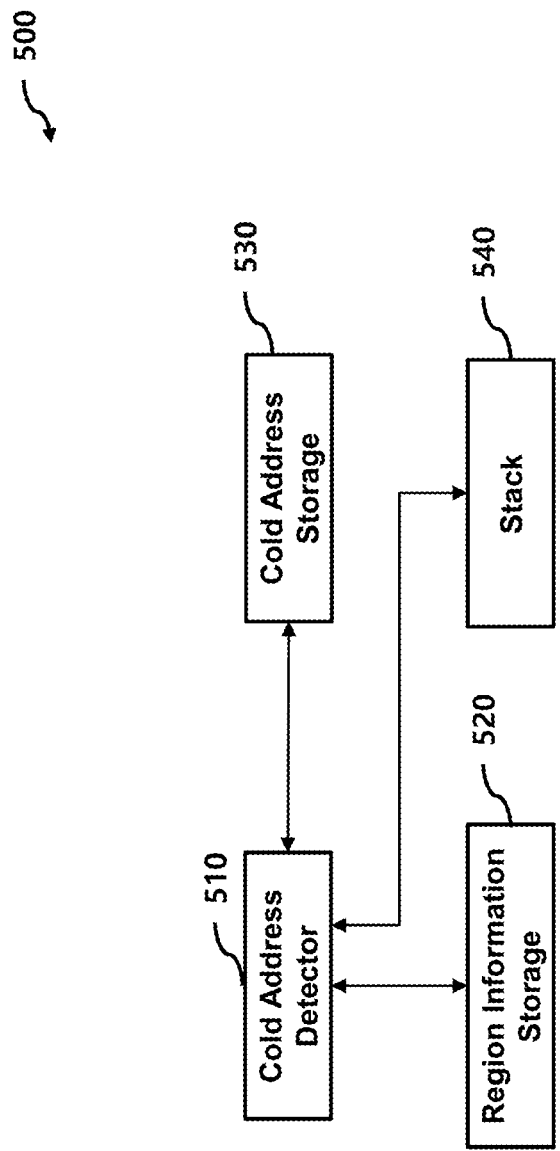
FIG. 5 shows a block diagram illustrating a cold address manager according to an embodiment of the present disclosure.

FIG. 5 shows a block diagram illustrating a cold address manager 500.

The cold address manager 500 includes a cold address detector 510, a region information storage 520, a cold address storage 530, and a stack 540.

The cold address detector 510 detects a cold address by referring to the region information storage 520 and the stack 540 and stores a detected cold address in the cold address storage 530.

The cold address manager 500 manages physical addresses on a region basis.

In the disclosed embodiment, one region includes up to four pages, and number of pages included in one region can be increased or decreased during a management operation. However, embodiments are not limited thereto.

The stack 540 stores meta data related to a region and is managed by the cold address detector 510.

Figure 6:
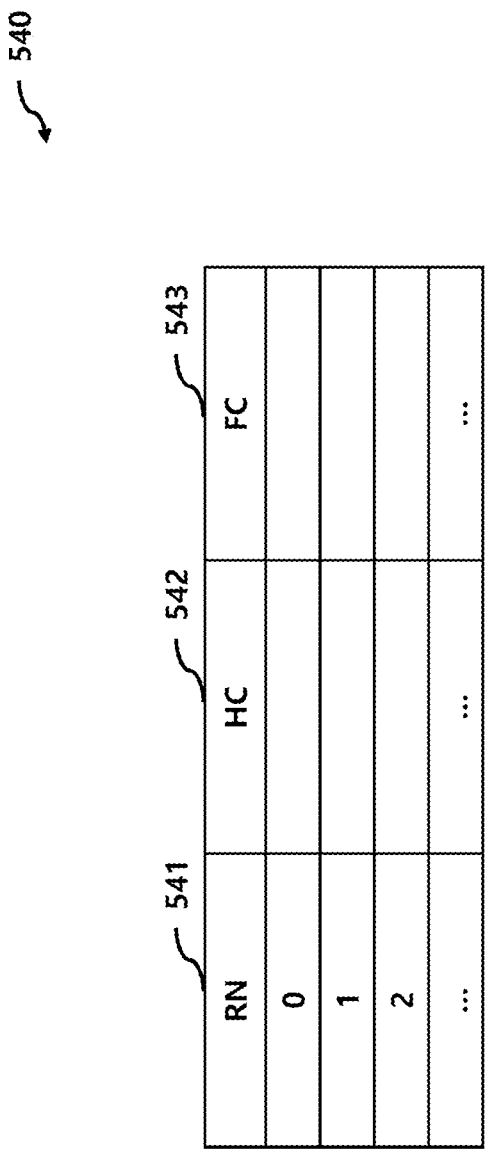
FIG. 6 shows a table illustrating a data structure of a stack according to an embodiment of the present disclosure.

FIG. 6 shows a table illustrating a data structure of a stack 540. The stack 540 includes zero or more rows.

Each row on the stack 540 includes a region number RN field 541, a hit count HC field 542, and a frequency count FC field 543.

The region number RN indicates a serial number for identifying a region. In the disclosed embodiment, one region includes up to four pages, and the serial number identifies those four pages. This will be described in detail below with reference to FIG. 9. The region number RN may also include a portion indicator indicating which portion of the region identified by the serial number a region corresponds to. For example, when a region of four pages is split, the region may be reduced to including the first two pages and an associated region including the last two pages may be created. The region number RN for the region would then have the serial number of the four pages and a portion indicator indicating the first half, and the region number RN for the associated region would have the serial number of the four pages and a portion indicator indicating the second half.

The hit count HC is related to number of write requests for the corresponding region. The hit count can be initialized at regular intervals.

For example, a hit occurs when a row having a region number corresponding to a physical address where a write request is to be performed exists on the stack 540, and a miss occurs when a row having a region number corresponding to a physical address where a write request is to be performed does not exist on the stack 540. A hit count of the row corresponding to a region number is increased when a hit occurs.

The frequency count FC is related to number of write requests. When a write request occurs, a frequency count of the row corresponding to a region number is increased if a hit occurs.

However, if a miss occurs during a write request, frequency counts can be reduced for all rows stored on the stack.

Hereinafter, number of rows stored in the stack 540 can be expressed as a stack size. The maximum value of the stack size can be predetermined.

In this disclosure, the stack 540 is empty at the beginning of the operation and a new row may be added or an existing row may be updated each time a write request is processed.

Thus, the stack 540 stores region numbers corresponding to addresses where write operations have been performed, so that the stack 540 may be used to filter an address having a warm property when selecting a cold address.

The region information storage 520 stores region information indicating a relationship between a physical address and a region.

In this disclosure, a physical address indicates a page address and region information stores relationship between a page and a region.

Figure 7:
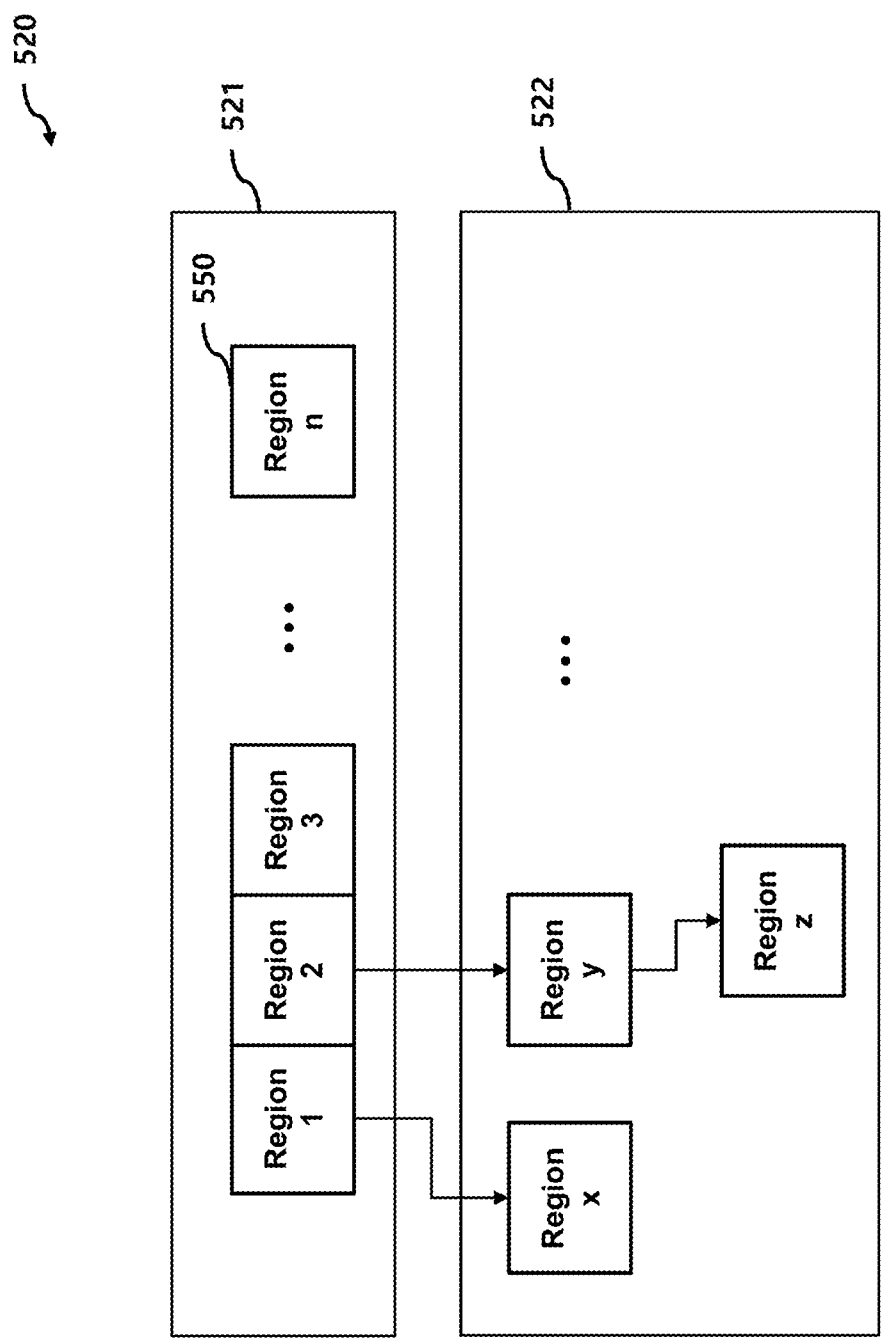
FIG. 7 shows a block diagram illustrating a region information storage according to an embodiment of the present disclosure.

FIG. 7 shows a block diagram illustrating a region information storage 520.

The region information storage 520 includes a first data structure 521 and a second data structure 522.

In the disclosed embodiment, the first data structure 521 stores region information 550 in an array, but embodiments are not limited thereto.

In the disclosed embodiment, the second data structure 522 includes a linked list associated with region information 550 of the first data structure 521, but embodiments are not limited thereto.

The linked list includes one or more region information and the number of region information included in the linked list can be adjusted by a split or a merge operation.

In FIG. 7, region 1 of the first data structure 521 is associated with region x of the second data structure 522.

Region 2 of the first data structure 521 is associated with region y of the second data structure 522, and region y is associated with region z.

Thus, the length of the linked list included in the second data structure 522 can be variably adjusted.

The split and merge operations will be described in detail below.

Figure 8:
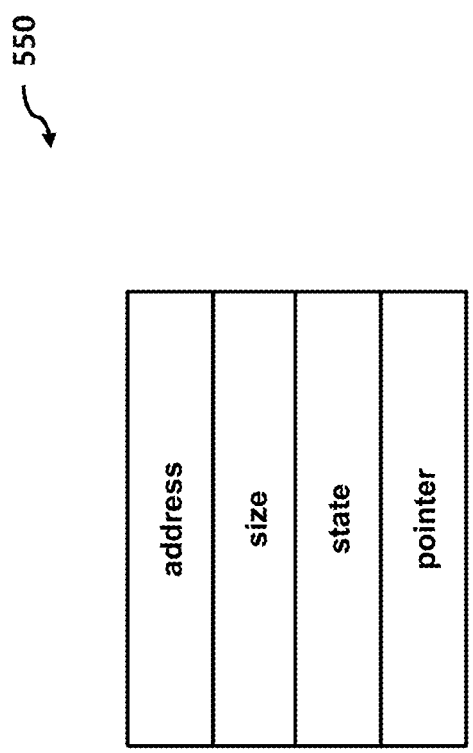
FIG. 8 shows a block diagram illustrating a data structure of region information according to an embodiment of the present disclosure.

FIG. 8 shows a block diagram illustrating a data structure of region information 550.

The region information 550 is a data structure for storing information on a corresponding region and includes an address field, a size field, a state field, and a pointer field.

In the disclosed embodiment, the address field stores an address of a first page included in a corresponding region, but embodiments are not limited thereto.

In the disclosed embodiment, the size fields stores number of pages included in a corresponding region, but embodiments are not limited thereto.

In the present disclosure, the state field stores a value representing degree of coldness of a corresponding region, and the value is controlled by the cold address detector 510.

In the present disclosure, the pointer field stores an address of the next region associated with a corresponding region.

Initially, the first data structure 521 of the region information storage 520 stores information of all regions.

In the disclosed embodiment, since the first data structure 521 has an array structure in which a storage space is allocated in advance, it is not necessary to perform a merge operation between the regions in the first data structure 521 to reduce storage space, but embodiments are not limited thereto.

In this case, as the number of pages initially included in each region is increased, the size of the first data structure 521 can be reduced.

However, other embodiments in which the merge operation is performed between the regions of the first data structure 521 will also be readily apparent to those of ordinary skill in the art from this disclosure.

For example, when a merge operation is allowed between the regions stored in the first data structure 521, various design changes such as limiting the merge operation for regions whose size are below a threshold value, may be implemented.

The region information is not initially stored in the second data structure 522 and number of region information may be altered by split or merge operations.

As described above, the variable list included in the second data structure 522 is generated by splitting a region included in the first data structure 521, thereby the length of the list may be increased.

In the disclosed embodiment, it is assumed that a split operation is possible when size of a corresponding region is greater than 1, but in other embodiments, it may be performed only when the size is greater than a threshold value larger than 1.

Also, a linked list included in the second data structure 522 may be reduced in length by a merge operation of the regions included therein, and may be deleted by being merged with a region included in the first data structure 521.

Figure 9:
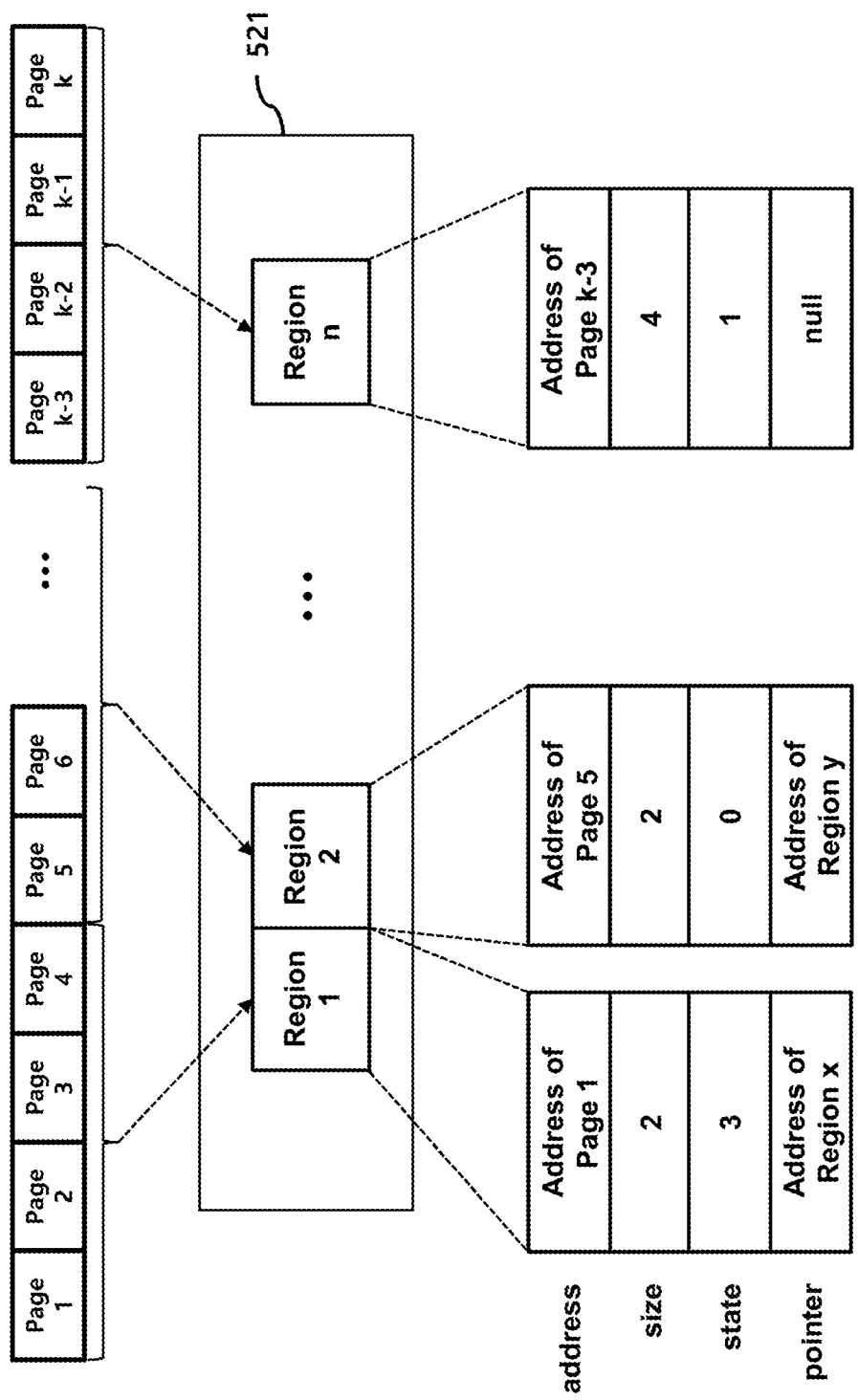
FIG. 9 shows a diagram illustrating relation between a physical address and region information according to an embodiment of the present disclosure.

FIG. 9 shows a diagram illustrating relation between a physical address and region information according to an embodiment of the present disclosure.

In the disclosed embodiment, a physical address represents a page address, and initially four pages are included in a region, but embodiments are not limited thereto. The default number of pages included in one region can be set larger.

In region information corresponding to region 1, FIG. 9 shows that the address field stores the address of page 1, the size field stores 2, the state field stores 3, and the pointer field stores the address of region x.

This means that the region 1 includes the two first pages from page 1 to page 4 (that is, pages 1 and 2), degree of coldness of region 1 is 3, and region 1 is associated with region x.

In region information corresponding to region 2, the address field stores the address of page 5, the size field stores 2, the state field stores 0, and the pointer field stores the address of region y.

In region information corresponding to region n, the address field stores the address of page k−3, the size field stores 4, the state field stores 1, and the pointer field stores null, where n and k are natural numbers, k>4 and k=4n.

Null in the pointer field indicates that there is no region associated with region n.

The cold address detector 510 detects a cold address while managing the region information storage 520 and the stack 540, and stores a detected cold address in the cold address storage 530.

Hereinafter, the operation of the cold address detector 510 will be described with reference to flow charts.

Figure 10:
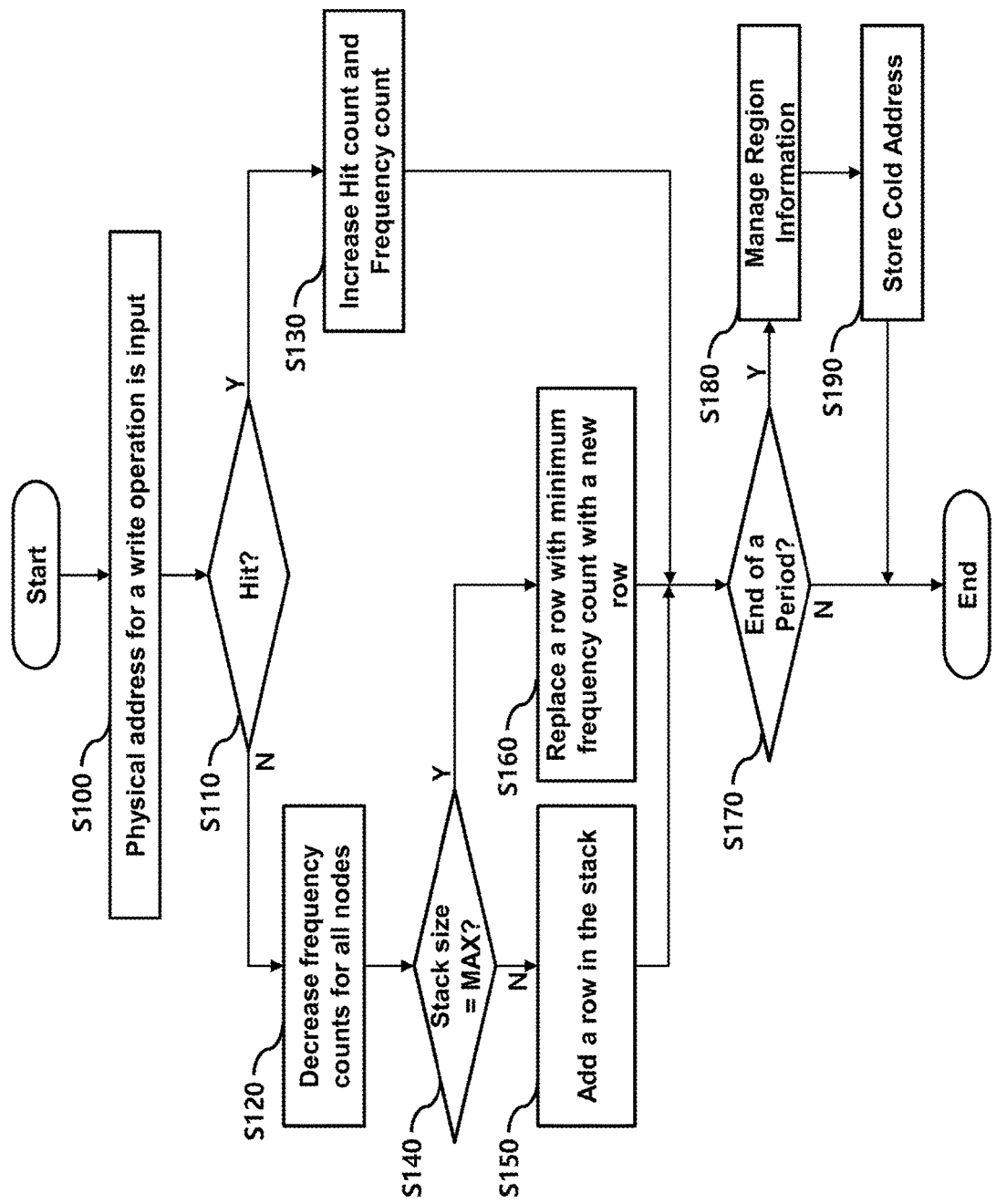
FIG. 10 shows a flow chart illustrating an operation of a cold address manager according to an embodiment of the present disclosure.

FIG. 10 shows a flow chart illustrating an operation of a cold address manager 500 according to an embodiment of the present disclosure. The operation of FIG. 10 may be executed in response to each write operation performed by the media controller 200.

First, the physical address for a write operation is input from the media controller 200 at step S100.

It is determined whether a hit has occurred based on whether a region corresponding to the physical address has a corresponding row stored in the stack 540 at step S110. The region corresponding to the physical address may be determined using the region information storage 520. For example, the region information 550 of the first data structure corresponding to the physical address may be accessed. If the pointer of the accessed region information 550 is null, then the region of the accessed region information 550 is the region corresponding to the physical address. If the pointer of the accessed region information 550 is not null, the linked list beginning with the accessed region information 550 is searched to determine the region corresponding to the physical address.

If a hit is determined, a hit count and a frequency count corresponding to the region number are increased in the row corresponding to the region number stored on the stack 540 at step S130 and the process moves to step S170.

If a miss is determined, frequency counts of all the rows stored on the stack 540 are decreased at step S120. If the frequency count of a row is 0, it is maintained at 0.

Increasing the hit count and the frequency count indicates that cold property is weakened.

Then, it is determined whether the current stack size is the maximum value at step S140.

If the current stack size is not the maximum value, a new row is added to the stack 540 at step S150 and the process advances to step S170.

The newly added row stores a region number of the newly added region, and the hit count and the frequency count of the new row are initialized to zero.

If the current stack size is the maximum value, one of the rows stored in the stack 540 is selected and replaced with the information of the new row at step S160, and the process advances to step S170.

In an embodiment, for the purpose of selecting a region with the least weakened cold property, the stack 540 replaces the row with the minimum frequency count with new row information.

Accordingly, in the stack 540, the existing region number is replaced with the new region number, and the frequency count and hit count are initialized to zero.

Then, it is checked whether a period has ended at step S170.

In an embodiment, whether the period has ended can be determined based on whether there has been a predetermined number of write requests since the beginning of the period.

For example, each time a write-requested physical address is input, a variable for identifying a period cycle is incremented and compared with the predetermined number to confirm that the period has ended.

If the period has not ended, the operation shown in FIG. 10 is completed.

If the period has ended, management of the region information is performed at step S180 and a cold address is stored at step S190.

Figure 11:
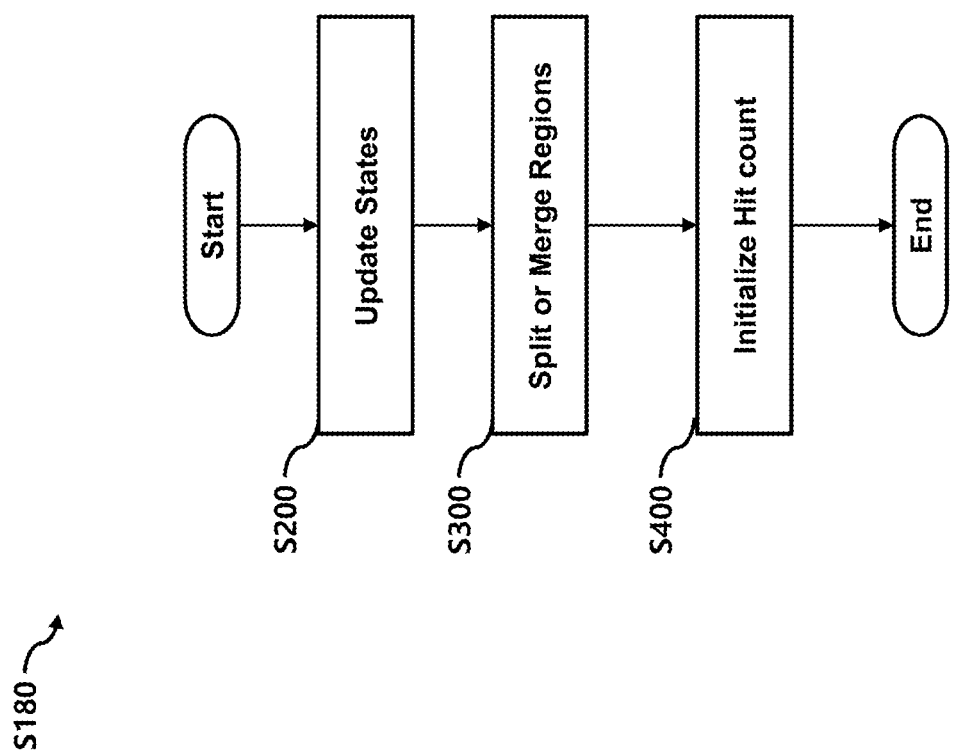
FIG. 11 shows a flow chart illustrating an operation to manage region information according to an embodiment of the present disclosure.

FIG. 11 shows a flow chart illustrating an operation to manage region information in the region information storage 520, according to an embodiment of the present disclosure.

The operation S180 for managing the region information includes an operation S200 for updating the state, an operation S300 for splitting or merging the region information and an operation S400 for initializing a hit count.

Figure 12:
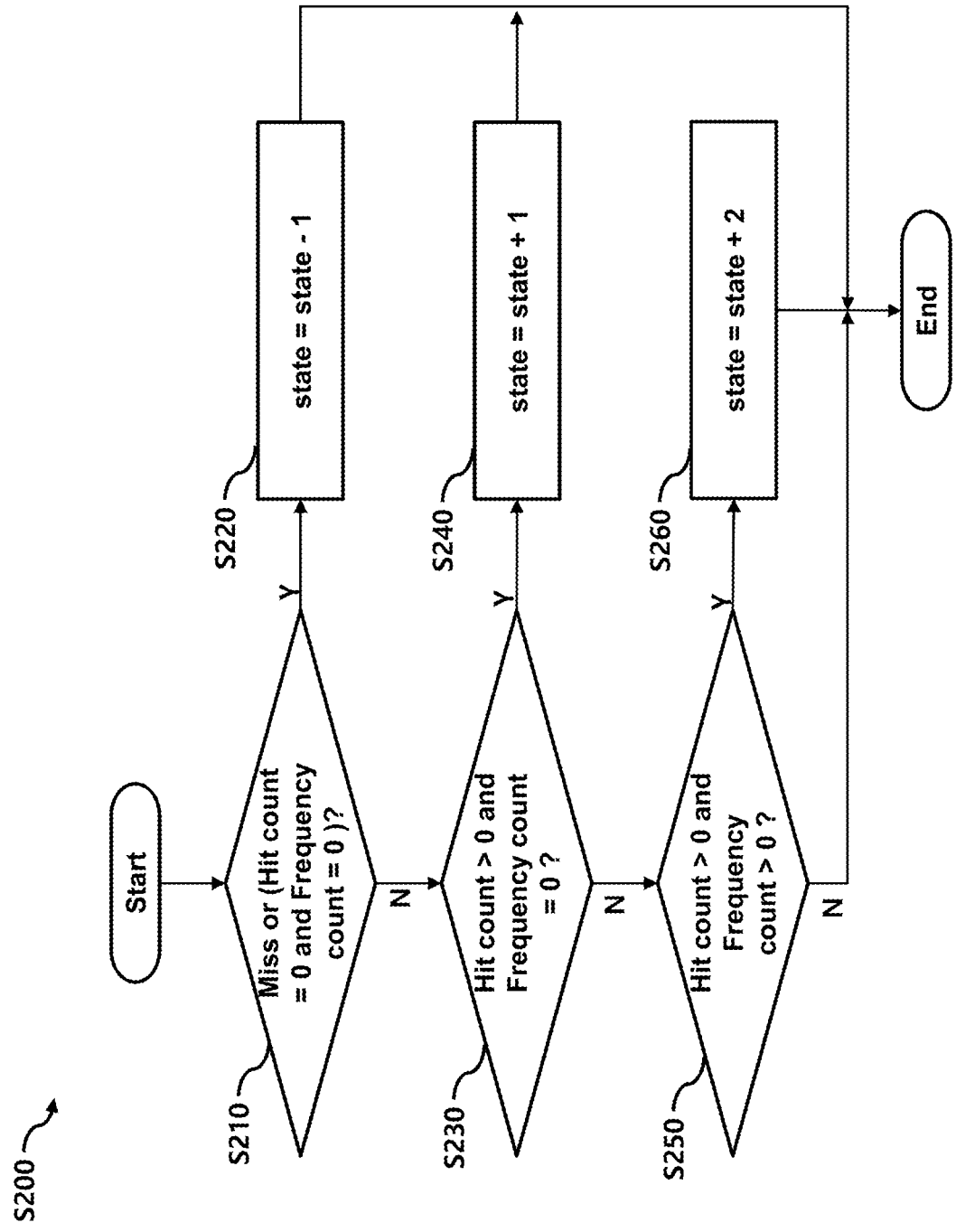
FIG. 12 shows a flow chart illustrating an operation to update states according to an embodiment of the present disclosure.

FIG. 12 shows a flow chart illustrating an operation S200 to update states according to an embodiment of the present disclosure.

The information in the stack 540 may be used to update states in the region information storage 520. The operation S200 is performed for each region in the region information storage 520.

First, if it is determined that either there is no row in the stack 540 that corresponds to the region number (that is, on a miss) or that the hit count in the row of the stack 540 corresponding to the region number is 0 and the frequency count in the row of the stack 540 is 0 at step S210, the state value of the region in the region information storage 520 is decreased by 1 at step S220, except if the state value is 0, it is kept at 0.

If it is determined that the hit count is greater than 0 and the frequency count is 0 at step S230, the state value is increased by 1 at step S240.

If it is determined that the hit count is greater than 0 and the frequency count is greater than 0 at step S250, the state value is increased by 2.

In the remaining cases, the state value remains unchanged.

Increasing the state value indicates that the degree of cold property in the corresponding region is relatively weakened.

Figure 13:
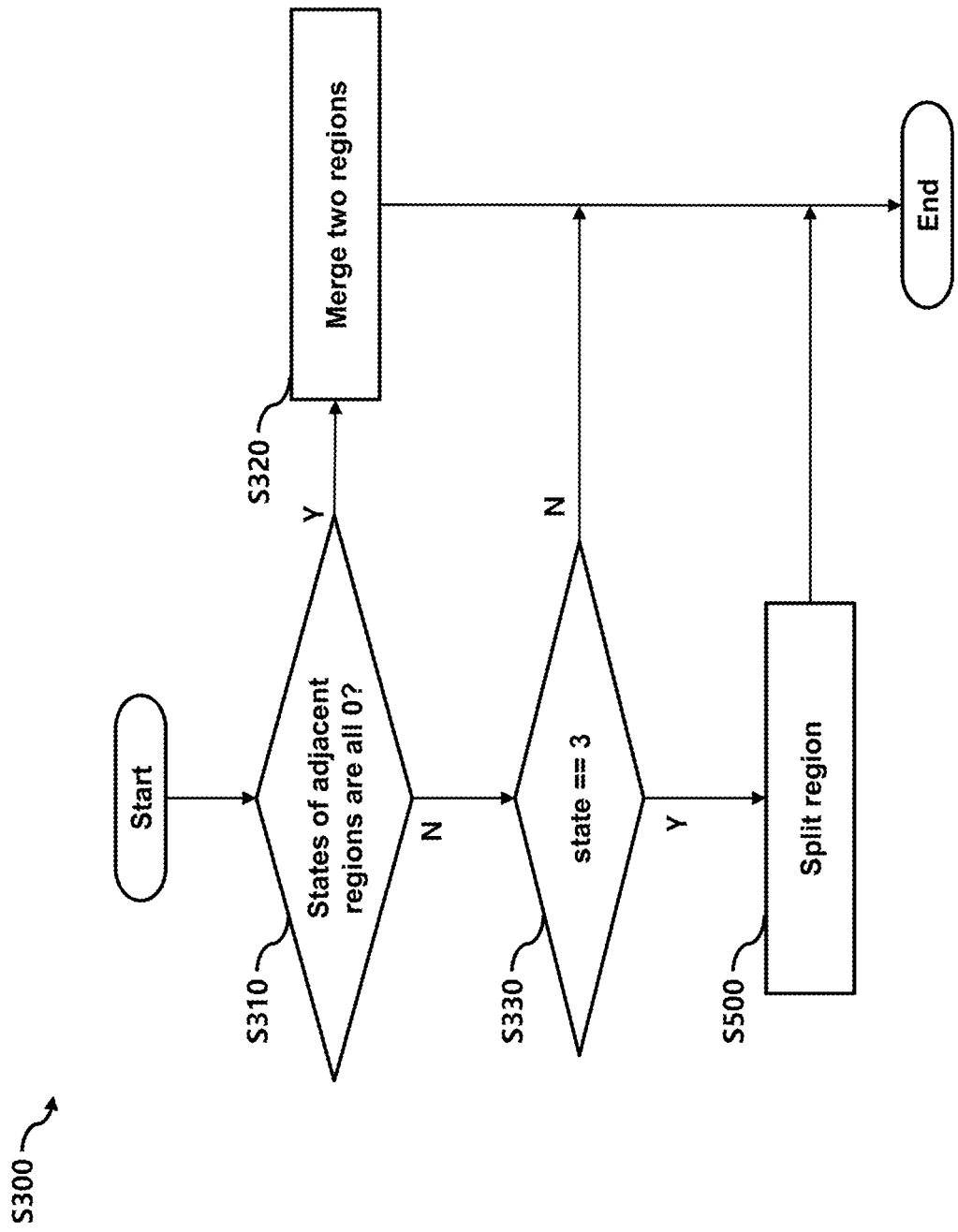
FIG. 13 shows a flow chart illustrating split or merge operations according to an embodiment of the present disclosure.

FIG. 13 shows a flow chart illustrating split or merge operations of regions in the region information storage 520 according to an embodiment of the present disclosure.

First, it is determined whether all the state values of adjacent regions are 0 at step S310. In an embodiment, adjacent regions are adjacent regions in a same linked list in the region information storage 520.

In the present disclosure, the region where the state value is 0 corresponds to the region where the cold degree is most strengthened.

In the present embodiment, if the state values of two adjacent region information are 0, they are merged at step S320.

Figure 14:
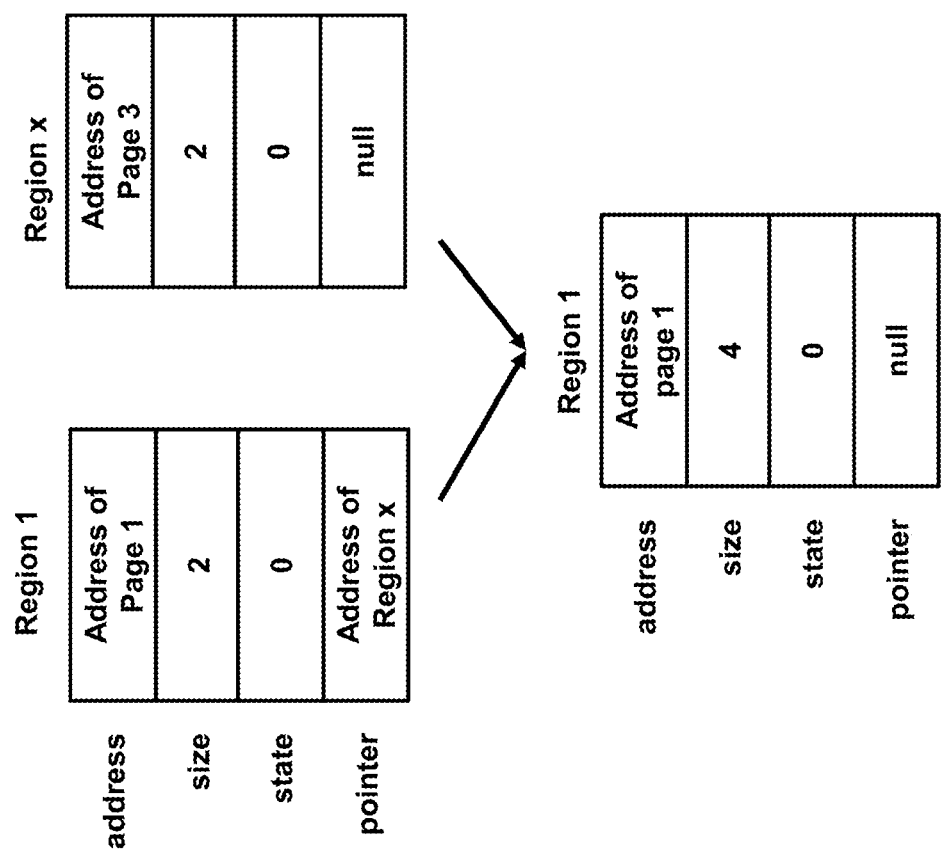
FIG. 14 shows a diagram illustrating an operation to merge regions according to an embodiment of the present disclosure.

FIG. 14 shows a diagram illustrating an operation to merge regions according to an embodiment of the present disclosure.

In FIG. 14, two adjacent regions are region 1 and region x.

In the region 1, the address field stores the address of page 1, the size field stores 2, the state field stores 0, the pointer fields stores the address of the region x. In the region x, the address field stores the address of page 3, the size field stores 2, the state field stores 0, the pointer fields stores null.

In the merged region, the address fields stores the same as the address field of the region 1, and the size field stores sum of the size of the region 1 and the size of the region x, and the pointer field stores as same as the pointer field of the region x.

Thus, in the merged region after the two regions are merged, the address field stores the address of page 1, the size field stores 4, the state field stores 0, the pointer fields stores null.

The merged region information may replace the information of the region 1 in the first data structure 521 and the information of the region x may be deleted from the second data structure 522 of the region information storage 520.

In this disclosure, since the region information included in the first data structure 521 is not merged, the region information to be deleted is limited to that included in the second data structure 522.

Thus, a row for the region x may be deleted or invalidated in the stack 540.

In stack 540, the frequency count for region 1 is updated to zero.

Since the hit count is initialized in step S400 of FIG. 11, it is not necessary to update the hit count for the region 1.

As described above, in the present embodiment, it is possible to reduce the sizes of the region information storage 520 and the stack 540 by merging adjacent regions which maintain the cold property.

If it is determined 'No' in step S310 of FIG. 13, it is determined whether the state value is 3 at step S330.

In the present embodiment, the region having the state value of 3 corresponds to the region whose cold property is most weakened.

In the present embodiment, a region information having a state value of 3 may be split at step S500.

Figure 15:
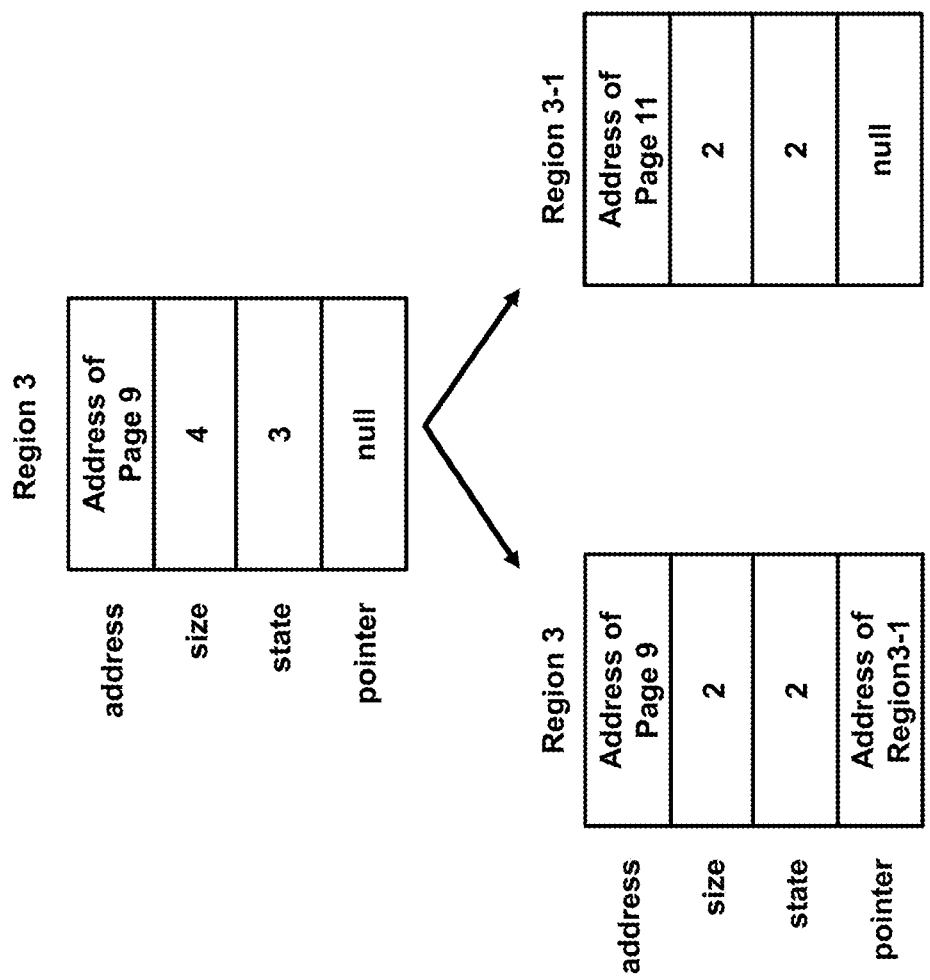
FIG. 15 shows a diagram illustrating an operation to split a region according to an embodiment of the present disclosure.

FIG. 15 shows a diagram illustrating an operation to split a region according to an embodiment of the present disclosure.

In FIG. 15, the region before splitting is region 3, whose address field stores the page address 9, the size field stores 4, the state fields stores 3, and the pointer field is null.

The number and size of the regions after a split operation may be variously changed according to the embodiment, but in the disclosed embodiment, one region is split into two regions having the same size.

As a result, a region 3-1 is additionally generated and region information corresponding to the region 3-1 stored in the second data structure 522 of the region information storage 520.

After splitting, the address of region 1 is the same as before, the size is reduced to 2, the state is updated to 2, which is the value obtained by dividing the state before splitting by 2 and rounding up, and the pointer is set to indicate the region information corresponding to region 3-1 in the second data structure 522.

The region information corresponding to the region 3-1 generated after the split is updated to the address of page 11, the size is 2, the state is also 2, and the pointer is set to null, which is a pointer of the region 3 before the split.

Figure 16:
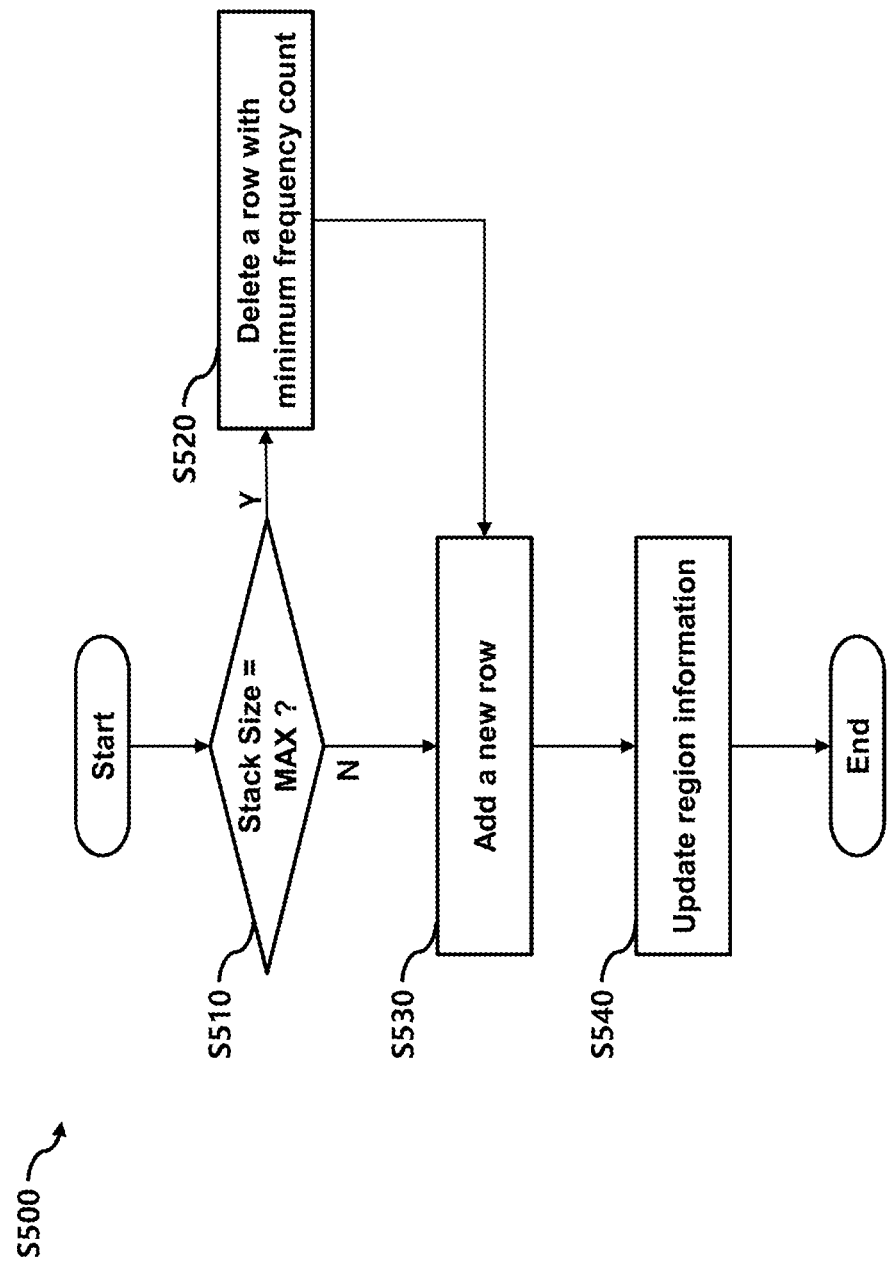
FIG. 16 shows a flow chart illustrating an operation to split a region according to an embodiment of the present disclosure.

FIG. 16 shows a flow chart illustrating an operation to split a region according to an embodiment of the present disclosure.

First, it is determined whether the stack size is the maximum value at step S510.

If the stack size is the maximum value, the row of the stack 540 having a minimum frequency count value among the existing rows stored in the stack 540 is deleted to secure a free space in step S520 and a new row is added to the stack 540 at step S530.

If the stack size is not the maximum value, a new row is added to the stack 540 at step S530.

The newly added row corresponds to the newly added region produced by the split operation.

The frequency count corresponding to each of the two regions after the split is reduced to ½ (rounded up) of the frequency count value for the pre-split region.

Thereafter, the region information is updated at step S540.

The update operation is the same as that described with reference to FIG. 15.

Then, returning to FIG. 11, the value of the hit count is initialized in the stack 540 at step S400.

Then, returning to FIG. 10, the cold address is stored after the split or merge operations at step S190.

In one embodiment, the physical address corresponding to a region where the state value of the corresponding region information in the region information storage 520 is equal to or less than a threshold value may be stored as a cold address.

At this time, if the number of the cold addresses stored in the cold address storage 530 is limited, the cold address can be selected in the ascending order of the state value.

If the state values are the same, the cold address can be selected with minimum frequency count or minimum hit count.

FIG. 10 shows an embodiment in which a cold address is stored every period. However, in another embodiment, an operation of storing or updating a cold address may be performed each time a write request is performed.

A scrubbing operation or a wear leveling operation may be performed after step S190 in FIG. 10.

At this time, the cold address manager 500 can notify the scrubbing controller 600 and the wear level controller 400 that the cold address storing operation is completed.

In response, the scrubbing controller 600 may proceed the scrubbing operation, and the wear level controller 400 may proceed the wear leveling operation.

In this case, the period determined to be ended at S170 of FIG. 10 (that is, the period between performances of the scrubbing operation, the wear leveling operation, or both) may be set to be shorter than the time when the data is damaged by drift phenomenon.

Although various embodiments have been described for illustrative purposes, it will be apparent to those skilled in the art that various changes and modifications may be made to the described embodiments without departing from the spirit and scope of the disclosure as defined by the following claims.

What is claimed is:

1. A semiconductor device comprising:
a media controller configured to output a write requested address in response to a write request to a nonvolatile memory device provided from a host; and
a cold address manager comprising a stack storing meta data for the write requested address, a region information storage configured to manage addresses of the nonvolatile memory device with regions wherein a length of a region of the regions is altered after a predetermined period, a cold address detector configured to update the stack and the region information storage after the predetermined period and to detect whether an address of the nonvolatile memory device is a cold address, the cold address having write requests performed at less than a predetermined level, wherein the region information storage is initialized to store a plurality of region information such that all addresses of the nonvolatile memory device have a corresponding region in the plurality of region information, and wherein each of the plurality of the region information includes an address field to store an address of a nonvolatile memory device related to a corresponding region, a state field storing a value representing a coldness property of the corresponding region, and a pointer field storing an address of a region related to the corresponding region.

2. The semiconductor device of claim 1, wherein the cold address manager further comprises a cold address storage to store the cold address.

3. The semiconductor device of claim 1, wherein the nonvolatile memory device performs a write operation according to a page basis, wherein each of the regions is initially related to a plurality of pages, and wherein the cold address detector periodically updates the region information storage by increasing or decreasing a number of pages related to a region referring to region information thereof and updated the meta data on the stack accordingly.

4. The semiconductor device of claim 1, wherein the stack is initially vacant.

5. The semiconductor device of claim 1, wherein the region information storage includes a first data structure and a second data structure, wherein the first data structure includes a data structure whose memory space is pre-allocated, and the second data structure includes a data structure whose length varies according to generation or deletion of a region related to a region stored in the first data structure.

6. The semiconductor device of claim 5, wherein the first data structure stores a plurality of region information each is related to a region and the first data structure is initialized such that the plurality of region information are related to all addresses of the nonvolatile memory device.

7. The semiconductor device of claim 1, wherein the cold address detector periodically updates the state field of each of the plurality of region information according to the meta data stored on the stack.

8. The semiconductor device of claim 7, wherein the cold address detector merges adjacent region information or splits a region information stored in the region information storage according to the state field.

9. The semiconductor device of claim 8, wherein the cold address detector merges the adjacent region information in response to the state field at each of the adjacent region information represents maximum coldness.

10. The semiconductor device of claim 9, wherein the cold address detector splits region information in response to the state field of a region information represents minimum coldness.

11. The semiconductor device of claim 7, wherein the cold address detector periodically detects region information whose state field represents maximum coldness and stores an address of the nonvolatile memory device related to the region information as a cold address.

12. The semiconductor device of claim 1, further comprising:
a wear level controller configured to control a wear leveling operation of the nonvolatile memory device using the cold address.

13. The semiconductor device of claim 12, further comprising a mapping table storing a mapping relation between a logical address and a physical address of the nonvolatile memory device, wherein the wear level controller controls the wear leveling operation by changing the mapping relation using the cold address.

14. The semiconductor device of claim 12, further comprising a hot address manager configured to detect a hot address where write requests are concentrated and to store the hot address, and wherein the wear level controller controls the wear leveling operation using a hot address provided by the hot address manager and the cold address provided by the cold address manager.

15. The semiconductor device of claim 1, further comprising a scrubbing controller configured to perform a scrubbing operation on the cold address of the nonvolatile memory device.

16. The semiconductor device of claim 15, wherein the scrubbing controller is configured to control the media controller to perform a read operation and a write operation on the cold address of the nonvolatile memory device.

17. The semiconductor device of claim 15, wherein the scrubbing operation is performed at a predetermined interval and the predetermined interval is less than time during which drift phenomenon at the nonvolatile memory device deteriorates data.

18. A semiconductor device comprising:
a media controller configured to output a write requested address in response to a write request to a nonvolatile memory device provided from a host; and
a cold address manager comprising a stack storing meta data for the write requested address, a region information storage configured to manage addresses of the nonvolatile memory device with regions wherein a length of a region of the regions is altered after a predetermined period, a cold address detector configured to update the stack and the region information storage after the predetermined period and to detect whether an address of the nonvolatile memory device is a cold address, the cold address having write requests performed at less than a predetermined level,
wherein the stack is initially vacant, and
wherein the stack includes a region number field including a region number, a hit count field storing a hit count wherein the hit count is increased according to a write request to a region that corresponds to the region number, a frequency count field storing a frequency count wherein the frequency count is decreased according to a write request to an other region that does not correspond to the region number.

* * * * *